(12) United States Patent
Pinto et al.

(10) Patent No.: US 11,820,206 B2
(45) Date of Patent: Nov. 21, 2023

(54) CLIMATE CONTROL DEVICE

(71) Applicant: GM Global Technology Operations LLC, Detroit, MI (US)

(72) Inventors: Nicholas W. Pinto, Shelby Township, MI (US); Anne M. Dailly, West Bloomfield, MI (US); Kuo-huey Chen, Troy, MI (US); Nathan Thompson, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 249 days.

(21) Appl. No.: 17/148,025

(22) Filed: Jan. 13, 2021

(65) Prior Publication Data

US 2022/0219510 A1    Jul. 14, 2022

(51) Int. Cl.
*B60H 3/02*    (2006.01)
*F24F 12/00*    (2006.01)

(52) U.S. Cl.
CPC ....... *B60H 3/024* (2013.01); *B60H 2003/026* (2013.01); *F24F 12/00* (2013.01)

(58) Field of Classification Search
CPC .... B60H 3/024; B60H 2003/026; F24F 12/00
USPC ............................................................ 62/271
See application file for complete search history.

(56) References Cited

U.S. PATENT DOCUMENTS

| | | | |
|---|---|---|---|
| 6,213,198 B1 * | 4/2001 | Shikata | B60H 1/3207 62/3.61 |
| 7,472,896 B1 * | 1/2009 | Tsai | F24F 6/105 261/DIG. 65 |
| 11,318,811 B2 * | 5/2022 | Kusukame | G08B 6/00 |
| 2011/0262118 A1 * | 10/2011 | McWilliams | H05B 3/748 392/418 |
| 2016/0334145 A1 * | 11/2016 | Pahwa | F25B 35/04 |
| 2018/0281127 A1 * | 10/2018 | Brunschwiler | B01J 20/3042 |
| 2020/0355383 A1 * | 11/2020 | Stahelin | F24F 6/10 |

* cited by examiner

*Primary Examiner* — Joel M Attey
(74) *Attorney, Agent, or Firm* — Vivacqua Crane PLLC

(57) ABSTRACT

A climate control device includes a radiant heater for radiating heat and a porous material attached to the radiant heater. The porous material desorbs a plurality of water molecules, in response to the porous material receiving heat from the radiant heater and raising a temperature of the water molecules in the porous material to a boiling temperature threshold. The porous material adsorbs the water molecules in response to the temperature of the water molecules falling below the boiling temperature threshold.

20 Claims, 4 Drawing Sheets

CLIMATE CONTROL DEVICE

INTRODUCTION

The present disclosure generally relates to climate control devices, and more particularly relates to a climate control device having a radiant heater and porous material for releasing heated water vapor that retains heat and has a density that is greater than ambient air so as to fill a lower portion of surrounding air before rising.

Existing motor vehicles include heating, ventilation, and air conditioning (HVAC) systems using air convection for delivering heated or cooled air into the passenger cabin to achieve a desired temperature within the passenger cabin. Air convection can require considerable time for causing passengers to feel warm because it can be necessary to heat the whole volume of air within the passenger cabin before the passengers feel warm. The HVAC system can require heat exchange in two stages to indirectly heat passengers, with a heat exchanger first heating air that in turn transfers heat to the passengers. The heated air rises within the passenger cabin and is prone to infiltration loss or drafts. Furthermore, air inefficiently heats thermal masses, such that a passenger can stop feeling warm as soon as the heated convection stops.

HVAC systems for electric vehicles make unique demands on battery packs already being used for propulsion and multiple other loads. In particular, achieving desired comfort levels within the passenger cabin of an electric vehicle must be reconciled with maximizing the driving range of the electrified vehicle.

Thus, while existing HVAC systems achieve their intended purpose, there is a need for a new and improved climate control device for a motor vehicle that addresses these issues.

SUMMARY

According to several aspects of the present disclosure, a climate control device includes a radiant for radiating heat. The climate control device further includes porous material attached to the radiant heater. The porous material desorbs a plurality of water molecules, in response to the porous material receiving heat from the radiant heater and raising a temperature of the water molecules in the porous material to a boiling temperature threshold. The porous material further adsorbs the water molecules, in response to the temperature of the water molecules falling below the boiling temperature threshold.

In one aspect, the radiant heater is a far infrared heater.

In another aspect, the far infrared heater is a weave including a plurality of conductive threads electrically coupled to a power source. The conductive threads generate heat, in response to the conductive threads receiving an electric current from the power source. The weave further includes a plurality of non-conductive threads interwoven with the conductive threads.

In another aspect, the conductive threads are coated with the porous material.

In another aspect, the non-conductive threads are coated with the porous material.

In another aspect, the porous material is selected from the group consisting of a zeolite, a silica gel, and a metal organic framework.

In another aspect, the porous material is a carbon-based compound coating on at least one of the conductive threads and the non-conductive threads.

According to several aspects of the present disclosure, a motor vehicle includes a passenger cabin having a plurality of door surfaces, a plurality of seat covers, a plurality of floors, and a ceiling liner. The motor vehicle further includes a climate control device having a power source and a radiant heater attached to at least one of the doors, the seats, the floors and the ceiling liner and positioned within the passenger cabin. The radiant heater is electrically connected to the power source to receive an electric current and radiate heat. The radiant heater transfers radiant heat directly to one or more passengers, surfaces within the passenger cabin, and porous material attached to the radiant heater for releasing moisture. The porous material desorbs a plurality of water molecules, in response to the porous material receiving radiant heat directly from the radiant heater and adsorbs the water molecules, in response to the porous material not receiving heat from the radiant heater.

In one aspect, the radiant heater is a far infrared heater.

In another aspect, the far infrared heater is a weave having a plurality of conductive threads electrically coupled to the power source. The conductive threads generate heat, in response to the conductive threads receiving the electric current from the power source. The weave further includes a plurality of non-conductive threads interwoven with the conductive threads.

In another aspect, the conductive threads are coated with the porous material.

In another aspect, the non-conductive threads are coated with the porous material.

In another aspect, the porous material is selected from the group consisting of a zeolite, a silica gel, and a metal organic framework.

In another aspect, the porous material is a carbon-based compound coating on at least one of the conductive threads and the non-conductive threads.

According to several aspects of the present disclosure, a method of operating a climate control device is provided for controlling a climate of a passenger cabin of a motor vehicle. The climate control device includes a power source, a radiant heater, a controller electrically connecting the radiant heater to the power source, and porous material. The method includes supplying, using the power source, an electric current to the radiant heater. The method further includes radiating, using the radiant heater, heat indirectly to one or more passengers, one or more surfaces within the passenger cabin, and porous material, in response to the radiant heater receiving the electric current from the power source. The method further includes desorbing, using the porous material, a plurality of water molecules in response to the porous material receiving radiant heat from the radiant heater.

In one aspect, the method further includes adsorbing, using the porous material, the water molecules in response to the temperature of the water molecules falling below the boiling temperature threshold.

In another aspect, the method further includes receiving, with a plurality of conductive threads of the radiant heater, an electric current from a power source. The method further includes generating, using the conductive threads, radiant heat in response to the conductive threads receiving the electric current from the power source.

In another aspect, the method further includes desorbing, using the porous material coated on the conductive threads, the water molecules in response to the porous material receiving radiant heat from the radiant heater.

In another aspect, the method further includes desorbing, using the porous material coated on a plurality of nonconductive threads of the radiant heater, the water molecules in response to the porous material receiving radiant heat from the radiant heater.

In another aspect, the method further includes adsorbing, using the porous material coated on at least one of the conductive threads and the non-conductive threads, the water molecules in response to the temperature of the water molecules falling below the boiling temperature threshold.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

An exemplary climate control device includes a radiant heater for radiating heat directly to individuals and surfaces within a range of the radiant heater. The climate control device further includes porous material attached to the radiant heater for releasing heated water vapor that retains the heat and has a density greater than ambient air so as to fill a lower portion of surrounding air before rising. As described in detail below, one non-limiting example of the radiant heater is a far infrared heater with a wavelength band of emission that is above 3 µm. However, other non-limiting examples of the radiant heater can include a medium infrared heater with a wavelength band of emission in the range between 1.4 µm and 3 µm or a short wave infrared heater or near infrared heater with a wavelength band of emission in the range from 780 nm to 1.4 µm. As also described in detail below, one non-limiting example of the climate control device can be integrated within a motor vehicle for heating passengers of the motor vehicle. The climate control device can be used in combination with an HVAC system of the motor vehicle or as a stand-alone device independent of the HVAC system. However, it is contemplated that the climate control device can be used as a stand-alone device in any enclosure, such as a room in a building or an outdoor tent, or in an outdoor environment. In still other non-limiting examples, the climate control device can be used in combination with an HVAC system of a building or in aerospace applications.

Figure 1:
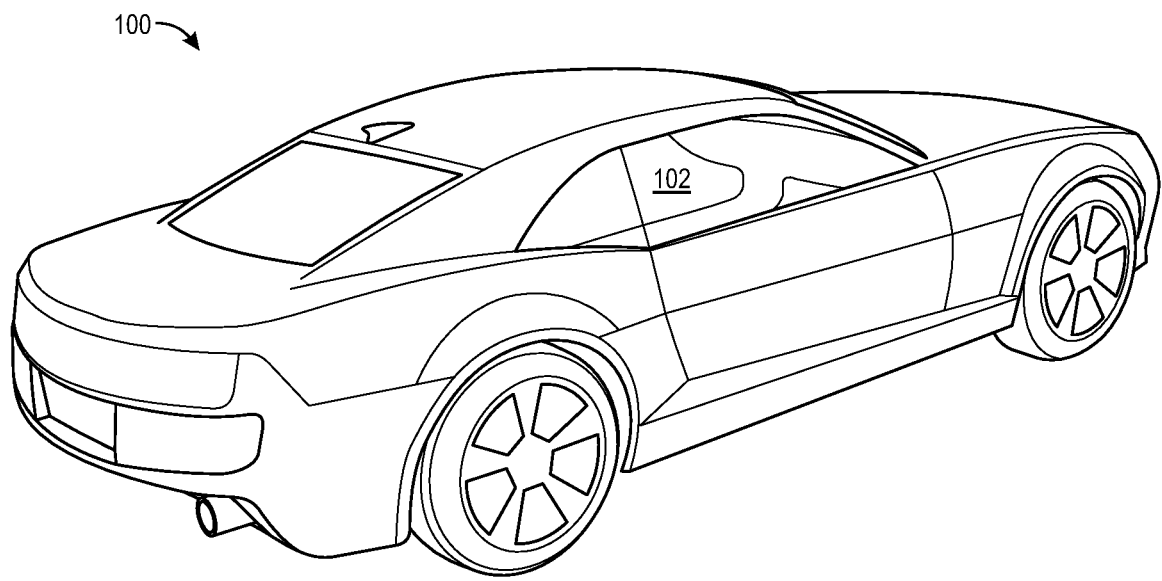
FIG. 1 is a perspective vehicle of one example of a motor vehicle having a passenger cabin with a climate control device.
Figure 2:
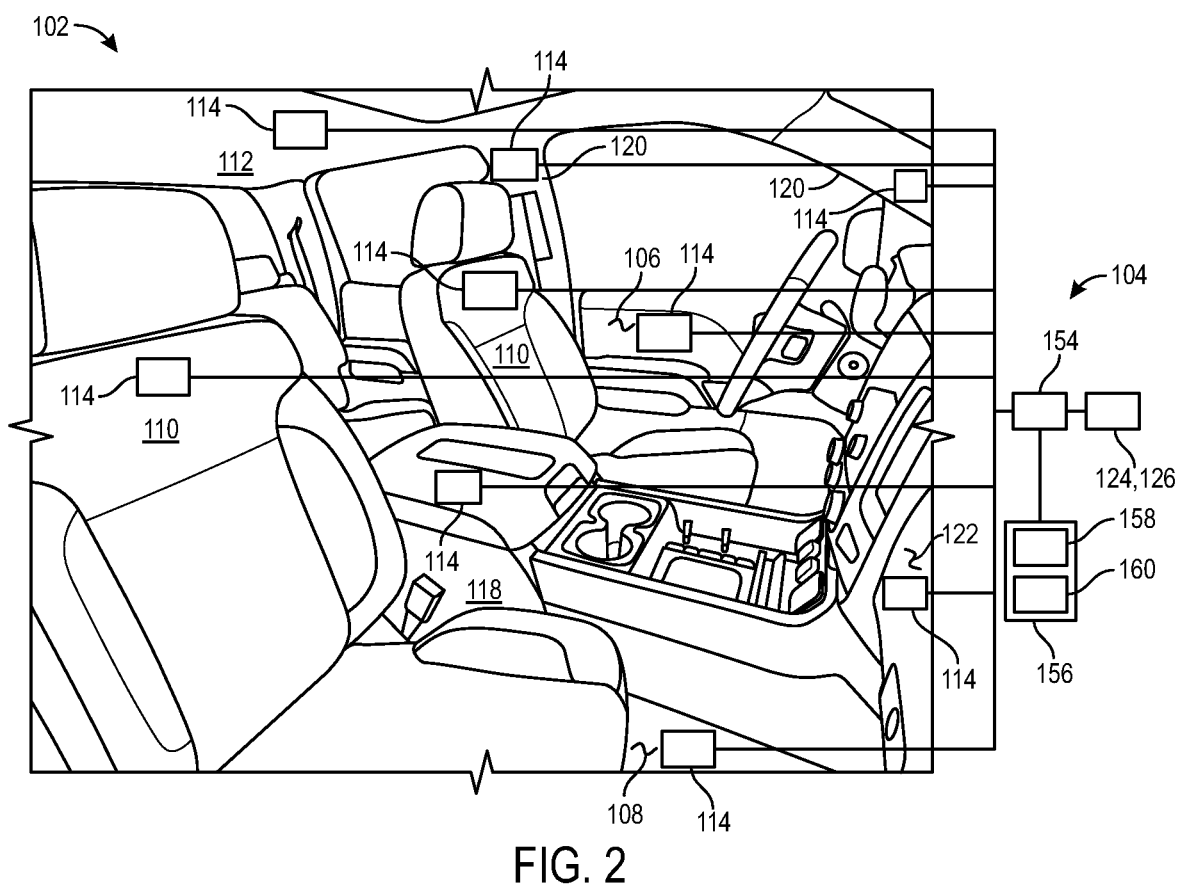
FIG. 2 is a perspective view of the passenger cabin of FIG. 1, illustrating the climate control device having one or more radiant heaters integrated within one or more door liners, seat covers, ceiling liners and floor liners facing the passenger cabin.

Referring to FIGS. 1 and 2, one example of a motor vehicle 100 includes a passenger cabin 102 and a climate control device 104 (FIG. 2) for using radiant heat and moisture to heat one or more passengers within the passenger cabin 102. As best shown in FIG. 2, the vehicle 100 includes a plurality of door surfaces 106, floor surfaces 108, seat covers 110, and a ceiling liner 112, which face the passenger cabin 102. The climate control device 104 includes one or more radiant heaters 114 and porous material 116 (FIGS. 5 and 6), which are integrated into the door surfaces 106, the floor surfaces 108, the seat covers 110, the ceiling liners 112 or any combination thereof. In other examples, the radiant heaters and porous material can be integrated in the center console 118, the side pillars 120, and the dashboard 122. It is also contemplated that the radiant heater can be integrated in other surfaces that face the passenger cabin, surfaces that define HVAC ducts, or surfaces that are disposed in other locations of the vehicle.

Figures 3, 4:
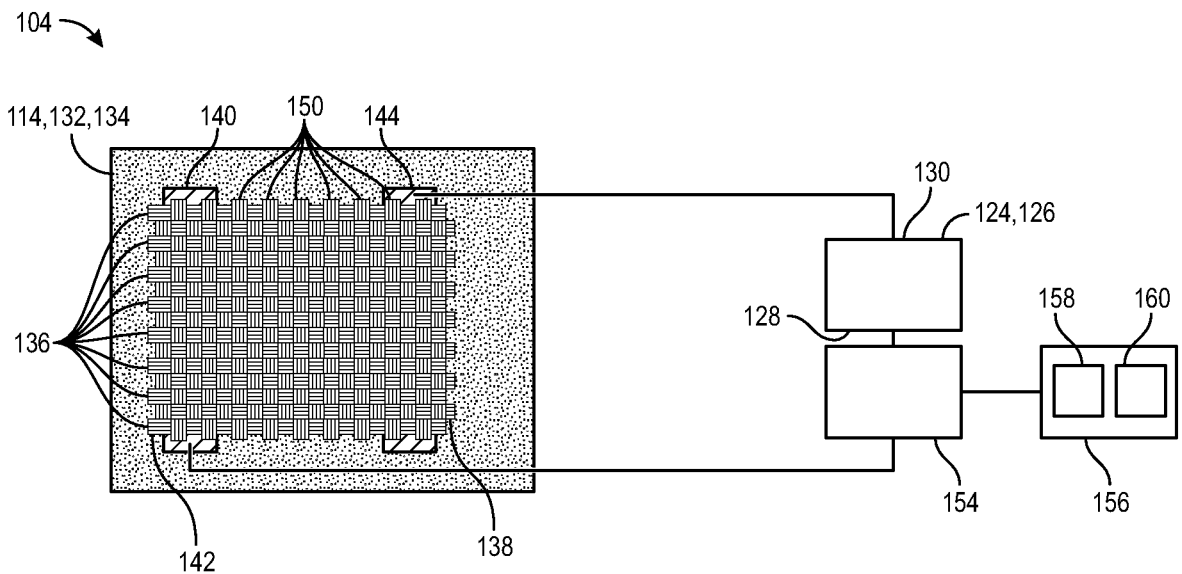
FIG. 3 is a schematic view of the climate control device of FIG. 2, illustrating the climate control device further having a power source and a controller, with one or more of the radiant heaters in the form of a weave including conductive threads electrically coupled to the power source.
FIG. 4 is an enlarged perspective view of a portion of the weave of FIG. 3, illustrating the weave including conductive threads and non-conductive threads, with each thread being a bundle of filaments.

Referring to FIG. 3, the climate control device 104 includes a power source 124. In this example, the motor vehicle 100 is an electric vehicle (EV) or a battery electric vehicle (BEV), and the power source 124 is a battery 126 or a battery pack having a positive terminal 128 and a negative terminal 130. However, in other examples, the motor vehicle can be an internal combustion engine (ICE) vehicle having an internal combustion engine, and the power source can be a battery or an alternator.

Referring again to FIG. 3, the radiant heater 114 is electrically connected to the power source 124 to receive an electric current and radiate heat, in response to receiving the electric current from the power source 124. In this example, the radiant heater 114 is a far infrared heater 132 or dark heater with a wavelength band of emission that is above 3 µm. The far infrared heater 132 can be in the form of a weave 134 having a plurality of conductive threads 136 electrically coupled to the power source 124 and generating radiant heat, in response to the conductive threads 136 receiving the electric current from the power source 124. Each conductive thread 136 includes a negative end 142 electrically coupled to a positive electrical feeder 140, which is in turn coupled to the positive terminal 128 of the power source 124. Each conductive thread 136 further includes a positive end 138 electrically coupled to a negative electrical feeder 144, which is in turn coupled to the negative terminal 130 of the power source 124. In this example, the conductive threads 136 are arranged parallel with one another, and each conductive thread 136 is a bundle of conductive filaments 146 (FIG. 4). The weave 134 further includes a plurality of non-conductive threads 148 interwoven with the conductive threads 136. The non-conductive threads 148 are arranged parallel with one another and perpendicular to the conductive threads 136 for reinforcing the conductive threads 136. Each non-conductive thread is a bundle of non-conductive filaments 150 (FIG. 4). However, it is contemplated that any of the threads can include a combination of conductive filaments and non-conductive filaments, and the threads can be positioned in any suitable arrangement relative to one another. In addition, a portion of the non-conductive threads can be arranged parallel with a portion of the conductive threads.

Figure 5:
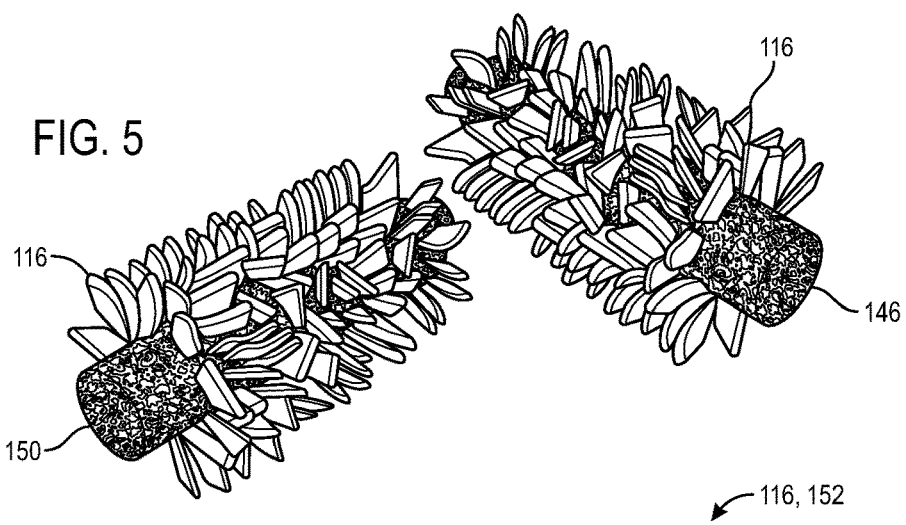
FIG. 5 is an enlarged perspective view of one conductive filament of one of the conductive threads and one non-conductive filament of one of the non-conductive threads of FIG. 4, illustrating each filament being coated with porous material for adsorbing and desorbing moisture within the passenger cabin.
Figure 6:
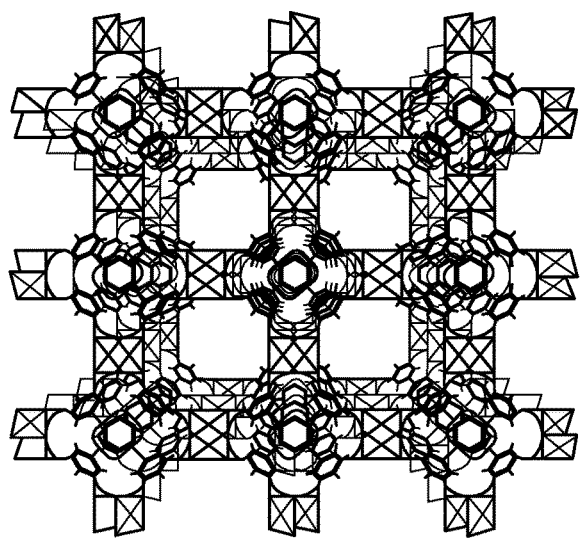
FIG. 6 is an enlarged schematic view of one example of the porous material of FIG. 5, illustrating the porous material in the form of a metal organic framework.

Referring to FIG. 5, the porous material 116 is coated onto the radiant heater 114. The porous material 116 desorbs a plurality of water molecules, in response to the porous material 116 receiving heat from the radiant heater 114 and raising the temperature of the water molecules in the porous material to a boiling temperature threshold. The porous material 116 adsorbs water molecules, in response to the temperature of the water molecules falling below the boiling temperature threshold. In one example, the porous material 116 is coated onto each one of the conductive filaments 146 and the non-conductive filaments 150. In other examples, the porous material can instead be coated onto only the conductive filaments or only the non-conductive filaments. In still another example, the porous material can be coated on only the outer surface of the thread or only the outer surface of the weave. The porous material 116 is a metal organic framework 152 (FIG. 6). However, it is contemplated that the porous material can be a zeolite, a silica gel, or a carbon-based compound coated onto at least one of the conductive filaments and the non-conductive filaments.

The climate control device 104 further includes a controller 154 or regulator for electrically connecting the radiant heater 114 to the power source 124. In one example, the controller 154 can be further electrically connected to an HVAC system 156 having a blower 158 for producing a flow of air and a heat exchanger 160 for heating the air. In operation, the controller 154 can electrically connect the radiant heater 114 to the power source 124 to provide radiant heating directly to passengers within the passenger cabin and the porous material when the controller 154 simultaneously actuates the HVAC system 156 to also provide convection heating. However, it is contemplated that the controller 154 can electrically connect the radiant heater 114 to the power source independent of HVAC operation.

Figure 7:
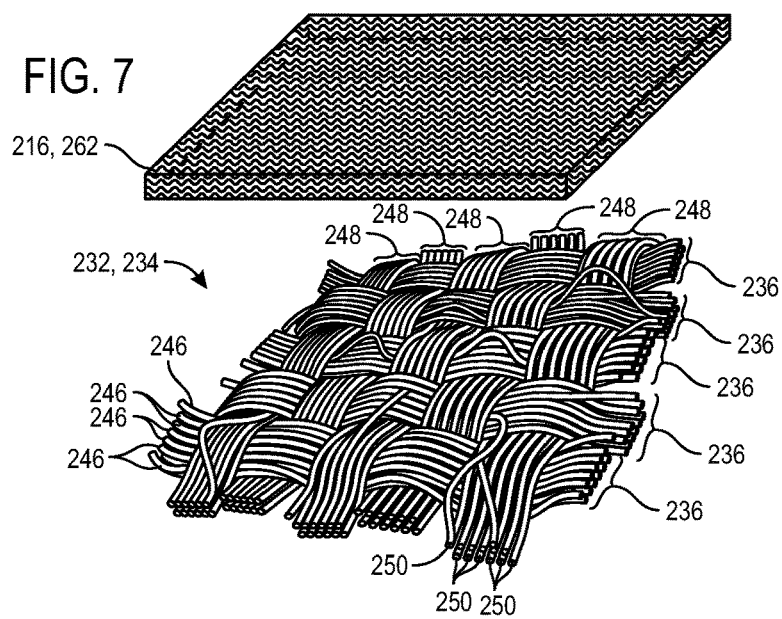
FIG. 7 is an enlarged exploded view of another example of the radiant heater and porous material of FIG. 4, illustrating the porous material in the form of an integral layer separate from the filaments.

Referring to FIG. 7, another example of a radiant heater 214 is similar to the radiant heater 114 of FIGS. 4-6 and includes components identified by the same numbers increased by 100. However, while the porous material 116 of FIGS. 4-6 is a metallic organic framework 152 coated onto each of the conductive filaments 146 and each of the non-conductive filaments 150, the porous material 216 is a separate layer 262 is positioned adjacent to the weave 134.

Figure 8:
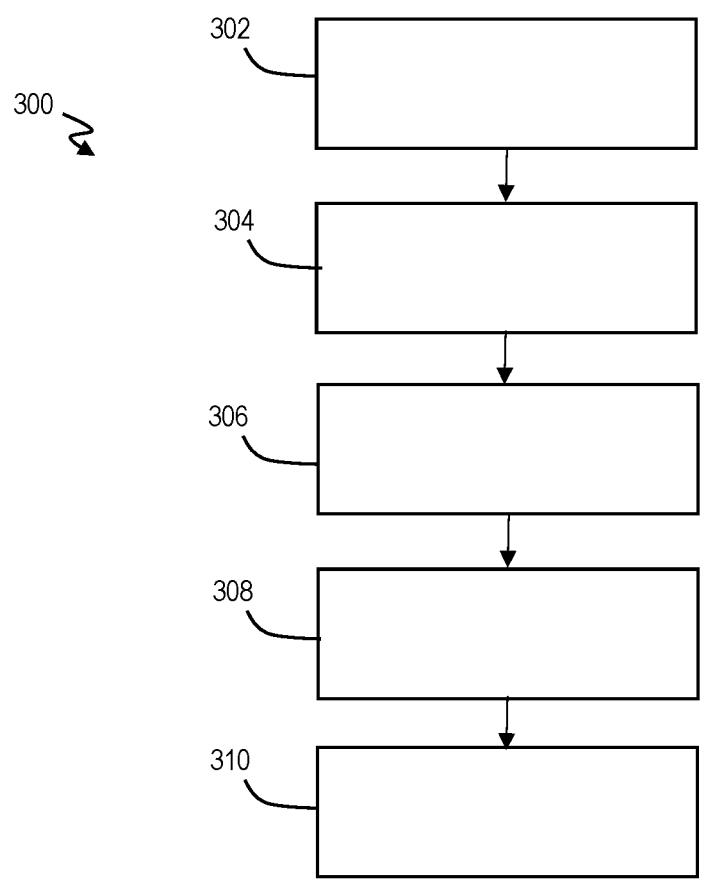
FIG. 8 is a flowchart of one example of a method of operating the climate control device of FIG. 3.

Referring to FIG. 8, a flow chart of one example of a method 300 of operating the climate control device 104 of FIG. 3 is illustrated. The method 300 commences at block 302 with the controller 154 electrically connecting the radiant heater 114 to the power source 124 to provide an electric current to the radiant heater 114. In one example, the controller 154 can electrically connect the radiant heater 114 to the power source 124, in response to a passenger operating the controller 154 to actuate the HVAC system 156 for providing convection heating. In another example, the controller 154 can be electrically connected to a dedicated switch or user interface and electrically connect the radiant heater 114 to the power source 124, in response to a passenger operating the switch or user interface.

At block 304, the radiant heater 114 radiates heat, in response to the radiant heater 114 receiving the electric current from the power source 124. In this example, each of the conductive filaments 146 of the conductive threads 136 generates radiant heat, in response to the conductive filaments 146 receiving the electric current from the power source 124.

At block 306, the porous material 116 desorbs water molecules, in response to the porous material 116 receiving heat from the radiant heater 114 and raising the temperature of the water molecules in the porous material above the boiling temperature threshold. In this example, the porous material 116 that is coated on the conductive threads 136 desorb the water molecules, in response to the porous material 116 receiving radiant heat from the radiant heater 114.

At block 308, the radiant heater 114 stops radiating heat, in response to the radiant heater 114 not receiving the electric current from the power source 124. A passenger may actuate the user interface or the dedicated switch, such that the controller discontinues the supply of electric current from the power source to the radiant heater.

At block 310, the porous material 116 adsorbs the water molecules in response to temperature of the water molecules falling below the boiling temperature threshold. In this example, the porous material 116 is coated on at least one of the conductive threads 136 and the non-conductive threads 148.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A climate control device comprising:
   a radiant heater for radiating heat; and
   a porous material directly attached to the radiant heater, with the porous material for desorbing a plurality of water molecules in response to the porous material receiving heat from the radiant heater and raising a temperature of the water molecules in the porous material to a boiling temperature threshold and adsorbing the water molecules in response to the temperature of the water molecules falling below the boiling temperature threshold.

2. The climate control device of claim 1 wherein the radiant heater is a far infrared heater.

3. The climate control device of claim 2 wherein the far infrared heater is a weave comprising:
   a plurality of conductive threads electrically coupled to a power source and generating heat in response to the conductive threads receiving the electric current from the power source;
   a plurality of non-conductive threads interwoven with the conductive threads.

4. The climate control device of claim 3 wherein the conductive threads are coated with the porous material.

5. The climate control device of claim 3 wherein the non-conductive threads are coated with the porous material.

6. The climate control device of claim 3 wherein the porous material is selected from the group consisting of a zeolite, a silica gel, and a metal organic framework.

7. The climate control device of claim 3 wherein the porous material is a carbon-based compound coating on at least one of the conductive threads and the nonconductive threads.

8. A motor vehicle comprising:
   a passenger cabin including plurality of door surfaces, a plurality of seat covers, a plurality of floors, and a ceiling liner; and a climate control device comprising:
  a power source;
  a radiant heater attached to at least one of the doors, the seats, the floors and the ceiling liner within the passenger cabin, with the radiant heater electrically connected to the power source to receive an electric current and radiate heat; and
  a porous material directly attached to the radiant heater, with the porous material for desorbing a plurality of water molecules in response to the porous material receiving heat from the radiant heater and raising a temperature of the water molecules in the porous material to a boiling temperature threshold and adsorbing the water molecules in response to the temperature of the water molecules falling below the boiling temperature threshold.

9. The motor vehicle of claim 8 wherein the radiant heater is a far infrared heater.

10. The motor vehicle of claim 9 wherein the far infrared heater is a weave comprising:
  a plurality of conductive threads electrically coupled to the power source and generating heat in response to the conductive threads receiving the electric current from the power source;
  a plurality of non-conductive threads interwoven with the conductive threads.

11. The motor vehicle of claim 10 wherein the conductive threads are coated with the porous material.

12. The motor vehicle of claim 10 wherein the non-conductive threads are coated with the porous material.

13. The motor vehicle of claim 10 wherein the porous material is selected from the group consisting of a zeolite, a silica gel, and a metal organic framework.

14. The motor vehicle of claim 10 wherein the porous material is a carbon-based compound coating on at least one of the conductive threads and the non-conductive threads.

15. A method of operating a climate control device for controlling a climate of a passenger cabin of a motor vehicle, the climate control device having a power source, a radiant heater, and a porous material directly attached to the radiant heater, the method comprising:
  supplying, using the power source, an electric current to the radiant heater;
  radiating, using the radiant heater, heat from the radiant heater in response to the radiant heater receiving the electric current from the power source; and
  desorbing, using the porous material, a plurality of water molecules from the porous material in response to the porous material receiving heat from the radiant heater and raising a temperature of the water molecules in the porous material to a boiling temperature threshold.

16. The method of claim 15 further comprising adsorbing, using the porous material, the plurality of water molecules in response to the temperature of the water molecules falling below the boiling temperature threshold.

17. The method of claim 16 further comprising:
  receiving, with a plurality of conductive threads, an electric current from a power source; and
  generating, using the plurality of conductive threads, heat in response to the plurality of conductive threads receiving the electric current from the power source.

18. The method of claim 17 further comprising desorbing, using the porous material coated on the conductive threads, the plurality of water molecules in response to the porous material receiving heat from the radiant heater.

19. The method of claim 17 further comprising desorbing, using the porous material coated on the non-conductive threads, the plurality of water molecules in response to the porous material receiving heat from the radiant heater.

20. The method of claim 17 further comprising adsorbing, using the porous material coated on at least one of the conductive threads and the non-conductive threads, the plurality of water molecules in response to the porous material not receiving heat from the radiant heater.

* * * * *